D. ANTHONY, Sr.
Hay-Fork.
No 7,694. Patented Oct. 8, 1850.
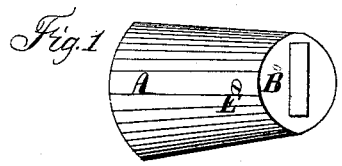
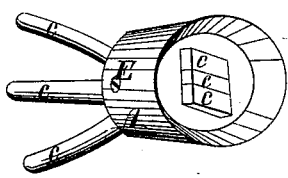
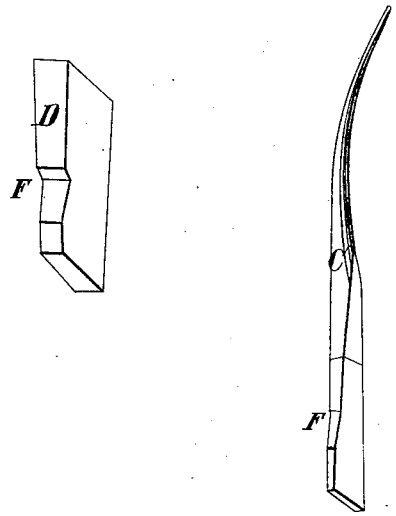
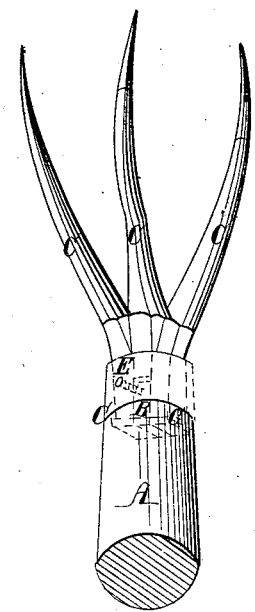
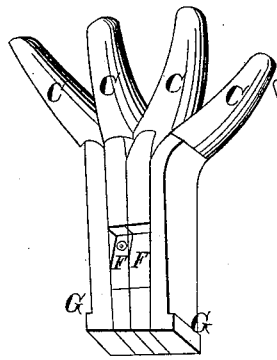
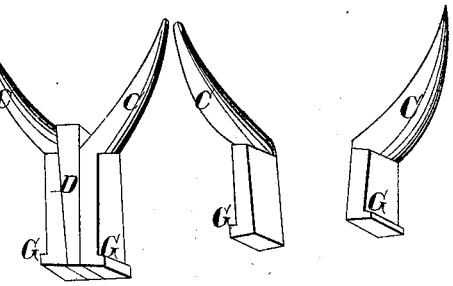

UNITED STATES PATENT OFFICE.

D. ANTHONY, SR., OF SPRINGPORT, NEW YORK.

IMPROVEMENT IN SHANKS OF HAY-FORKS.

Specification forming part of Letters Patent No. 7,694, dated October 8, 1850.

*To all whom it may concern:*

Be it known that I, DAVID ANTHONY, Sr., of the town of Springport, in the county of Cayuga and State of New York, have invented a new and useful Improvement on Hay and Manure Forks; and I do hereby declare that the following is a full, clear, and exact description of the construction and operation of the same, reference being had to the annexed drawings, making a part of this specification, in which—

Figure 1 represents a perspective view of the ferrule A, with B, the socket or mortise, at the smaller end to receive the tines C C C.

Fig. 2 is a perspective view of the socket with the tines C C C placed in the socket. C C C represent the shank end of the tines, (seen through the opening,) that admits the handle to the fork in the ferrule.

Fig. 3 is a perspective view of all the parts of the three-tined fork in combination. E represents the set-screw; A, the ferrule; F, the cavity settled in the shank of the tine to receive the set screw E. G G represent catches at the end of the tines, that catch against an interval projection in the socket or ferrule. The ferrule in Fig. 3 is represented as transparent, the better to display the parts in combination.

Fig. 4 is a perspective view of the shanks of four tines to be placed in the ferrule A in the same manner as in Fig. 3, the shanks of the two middle tines answering as a key, against which the set-screw E presses to hold the whole firmly in their places.

Fig. 5 is a perspective view of the two-tined fork held in place in the ferrule A, as in Fig. 3, by the key D, against which the set-screw E presses at the indent F to hold the whole in place firmly.

Fig. 6 is a view of the middle key, tined with the catch or indent F, against which the set-screw presses.

My improvement consists in making the tines and ferrule to receive them in a way and manner so that either of the tines may be detached, if necessary, and another put in its place. In making the tines a shank of about one inch in length is made to each in a uniform manner to fit in the socket or mortise in the ferrule designed to receive them, which mortise is of an oblong form, of the capacity to receive two or more tines of sufficient size to give the required strength. The ferrule to receive the handle and tine is about four inches long, the handle taking about three inches and the shank of the tines the other inch. The socket in the ferrule designed to hold the tines has an internal projection or flange about seven-eighths of an inch from the end. This is for the purpose of holding the outside tines, which have the projection or catch G G near the end, which being put beyond the projection mentioned in the socket and put in place by inserting the middle tine as a key to hold the outside tines in place. Thus a three-tined fork is made, the middle tine being held by the set-screw E. If four tines are used, the two middle ones operate as a key. If two tines only are used, there must be a short key, D, in place of the middle tine. The key is made the same as the shank of the middle tine and fastens the same.

What I claim as my invention, and desire to secure by Letters Patent, is—

Constructing the hay, straw, and manure forks with two or more tines in a separate manner, and confined in a socket, as set forth in the above specification and drawings, or otherwise substantially the same, in a way and manner so that either of the tines can be taken out of the socket and another put in its place, if necessary.

DAVID ANTHONY, SR.

Witnesses:
  A. C. MUNGER,
  E. H. MUNGER.